United States Patent
Knight

(10) Patent No.: US 9,478,073 B2
(45) Date of Patent: Oct. 25, 2016

(54) FRIENDLY MAINTENANCE AND RECALL NOTIFICATIONS

(71) Applicant: Toyota Motor Sales, U.S.A., Inc., Torrance, CA (US)

(72) Inventor: Cynthia Ann Knight, Redondo Beach, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 0 days.

(21) Appl. No.: 14/448,532

(22) Filed: Jul. 31, 2014

(65) Prior Publication Data

US 2016/0035146 A1 Feb. 4, 2016

(51) Int. Cl.
*G06F 17/30* (2006.01)
*G06Q 10/00* (2012.01)
*G07C 5/00* (2006.01)
*B60Q 9/00* (2006.01)
*B60Q 1/00* (2006.01)

(52) U.S. Cl.
CPC ............ *G07C 5/006* (2013.01); *B60Q 1/00* (2013.01); *B60Q 9/00* (2013.01); *G06Q 10/20* (2013.01)

(58) Field of Classification Search
CPC ...... G07C 5/008; G07C 5/0808; G07C 5/08; G07C 5/006; G06Q 10/20; G06Q 50/01; B60W 50/0097; B60W 50/04; E02F 9/267; B60R 16/0234; B61L 15/0081; G01S 19/14; G05B 23/0283; G01C 21/3484; B60T 2270/406; B60T 8/172; F16D 66/00
See application file for complete search history.

(56) References Cited

U.S. PATENT DOCUMENTS

| | | | |
|---|---|---|---|
| 5,382,942 A | 1/1995 | Raffa et al. | |
| 7,551,063 B2* | 6/2009 | Inbarajan | 340/425.5 |
| 8,041,779 B2* | 10/2011 | Habaguchi et al. | 709/219 |
| 8,155,817 B2* | 4/2012 | Oesterling | 701/29.5 |
| 8,495,179 B2* | 7/2013 | Habaguchi et al. | 709/219 |
| 8,781,442 B1* | 7/2014 | Link, II | G08G 1/205 370/338 |
| 8,924,071 B2* | 12/2014 | Stanek et al. | 701/31.4 |
| 2004/0128067 A1* | 7/2004 | Smith | G01C 21/26 701/516 |

(Continued)

FOREIGN PATENT DOCUMENTS

CN 101628572 A 1/2010

*Primary Examiner* — Jerrah Edwards
*Assistant Examiner* — Demetra Smith-Stewart
(74) *Attorney, Agent, or Firm* — Christopher G. Darrow; Darrow Mustafa PC

(57) ABSTRACT

Disclosed herein are devices, systems, and methods for providing friendly maintenance and recall notifications. Drivers can have personalized online driver profiles that indicate preferences for one or more notification classes, each notification class having a consistent theme or style. When a maintenance or recall condition arises, the driver can be presented with a notification that is both specific to the particular maintenance condition and associated with the notification class for which the driver has indicated a preference. Maintenance conditions can be detected by one or more sensors. Notifications for recall conditions can be sent from a remote server and received at the vehicle. A plurality of notifications related to a particular condition can be stored in a notification database, and the driver can be presented with a random notification, consistent with the driver's preferences, from the plurality of available notifications.

20 Claims, 3 Drawing Sheets

(56) References Cited

U.S. PATENT DOCUMENTS

| | | | | |
|---|---|---|---|---|
| 2004/0203974 A1* | 10/2004 | Seibel | G07C 5/008 | 455/517 |
| 2005/0261815 A1* | 11/2005 | Cowelchuk | B60R 16/037 | 701/36 |
| 2006/0069728 A1* | 3/2006 | McEvilly | G06F 17/2264 | 709/206 |
| 2008/0022208 A1* | 1/2008 | Morse | G11B 27/105 | 715/727 |
| 2009/0177351 A1 | 7/2009 | Watkins et al. | | |
| 2010/0222939 A1* | 9/2010 | Namburu et al. | | 701/2 |
| 2010/0223341 A1* | 9/2010 | Manolescu | G06F 17/30905 | 709/206 |
| 2011/0196571 A1* | 8/2011 | Foladare et al. | | 701/33 |
| 2013/0332004 A1* | 12/2013 | Gompert et al. | | 701/1 |
| 2014/0277844 A1* | 9/2014 | Luke | G07C 5/008 | 701/2 |
| 2014/0310788 A1* | 10/2014 | Ricci | | 726/6 |
| 2015/0286994 A1* | 10/2015 | Elder | G06Q 10/20 | 705/305 |

* cited by examiner

FRIENDLY MAINTENANCE AND RECALL NOTIFICATIONS

BACKGROUND

This disclosure relates to a vehicle and more particularly to devices, systems, and methods for notifications regarding maintenance and recall conditions.

Drivers are generally familiar with dashboard lights that indicate a maintenance condition to be addressed (such as a scheduled oil change or low tire pressure, or an irregularity in one of the vehicle systems as indicated by a "check engine light"). Recently, newer display technology used in consumer vehicles such as color and interactive displays has allowed notifications to be provided to drivers that are more informative than simple lighted or blinking dashboard icons. Nevertheless, many drivers still feel intimidated by vehicle maintenance and many tend to ignore these notifications, which continue to be viewed as strident, sterile, and unfriendly.

Additionally, from time to time vehicles may be subject to recall notices for issues that require servicing by the dealer. These notices are generally mailed out by the vehicle manufacturer or dealer to the mailing address of the owner of the vehicle that the manufacturer or dealer has on file. Vehicle owners sometimes complain that they do not receive these notices when they have in fact been mailed out. Often in such cases, the owner did receive the mailing but threw it away without reading it, mistaking it for a marketing mailing. Furthermore, many vehicle owners do not read the notices carefully as they may find them difficult or too technical to follow. Finally, even if the owner does read a notice at home the owner may still not remember to take care of the issue and take the vehicle for repair when the owner has the opportunity to do so.

SUMMARY

Disclosed herein are devices, systems, and methods for providing friendly maintenance and recall notifications. Drivers can have personalized online driver profiles that indicate preferences for one or more types or classes of notifications, each type or class having a consistent theme (such as a style of humor or an association with a media element such as a popular television program, movie, or music artist/group). A driver can be identified by a computing device associated with the vehicle, for example using biometric sensors. When a maintenance or recall condition arises, the driver can be presented with a notification that is both specific to the particular maintenance or recall condition and associated with the notification class for which the driver has indicated a preference.

One example computing device for providing friendly notifications includes one or more processors for controlling operations of the computing device; and a memory storing data and program instructions used by the one or more processors, wherein the one or more processors execute instructions stored in the memory to: identify an occupant of the vehicle; select a notification relating to a current maintenance condition relating to the vehicle, wherein the selected notification is consistent with a preference of the occupant; and notify the occupant of the current maintenance condition using the selected notification.

One example method for providing friendly notifications includes sending, by a remote server to a vehicle, a recall notification relating to a recall condition associated with the vehicle; receiving, by a computing device associated with the vehicle, the recall notification; and notifying an occupant of the vehicle, by the computing device, using the recall notification.

One example system for providing friendly notifications includes a vehicle; at least one of an audio speaker and a display associated with the vehicle; and a computing device in communication with the at least one of an audio speaker and a display, the computing device comprising one or more processors for controlling the operations of the computing device and a memory for storing data and program instructions used by the one or more processors, wherein the one or more processors execute instructions stored in the memory to: identify the occupant of the vehicle; select a notification from a plurality of notifications relating to at least one of a current maintenance condition and recall condition relating to the vehicle, wherein the selected notification is consistent with a preference of the occupant; and notify the occupant of the current maintenance condition using the selected notification, wherein the notification is delivered using at least one of the audio speaker and the display.

BRIEF DESCRIPTION OF THE DRAWINGS

The description herein makes reference to the accompanying drawings wherein like reference numerals refer to like parts throughout the several views, and wherein.

DETAILED DESCRIPTION

Disclosed herein are devices, systems, and methods for providing friendly maintenance and recall notifications. Drivers can have personalized online driver profiles that indicate preferences for one or more types or classes of notifications, each type or class having a consistent theme (such as a style of humor or an association with a media element such as a popular television program, movie, or music artist/group). A driver can be identified by a computing device associated with the vehicle, for example using biometric sensors. When a maintenance or recall condition arises, the driver can be presented with a notification that is both specific to the particular maintenance condition and associated with the notification class for which the driver has indicated a preference. Furthermore, a plurality of notifications related to a particular maintenance condition can be stored in a notification database, and the driver can be presented with a notification (consistent with the driver's preferences) selected at random from the plurality of available notifications. In addition, the content of the notification can vary with maintenance escalation, which can be based on the number of times the driver has already been notified about the maintenance condition, the amount of time passed since the driver's first notification, the increasing severity of the maintenance condition, or some other metric (such as the number of miles driven with the maintenance condition present).

If there is a recall condition associated with the vehicle, the manufacturer can remotely transmit a recall notification to the vehicle. The recall notification can be presented to the driver, either immediately or the next time the driver turns on the vehicle. The recall notification can also be modified consistent with and based on the driver's preselected notification preferences.

Figure 1:
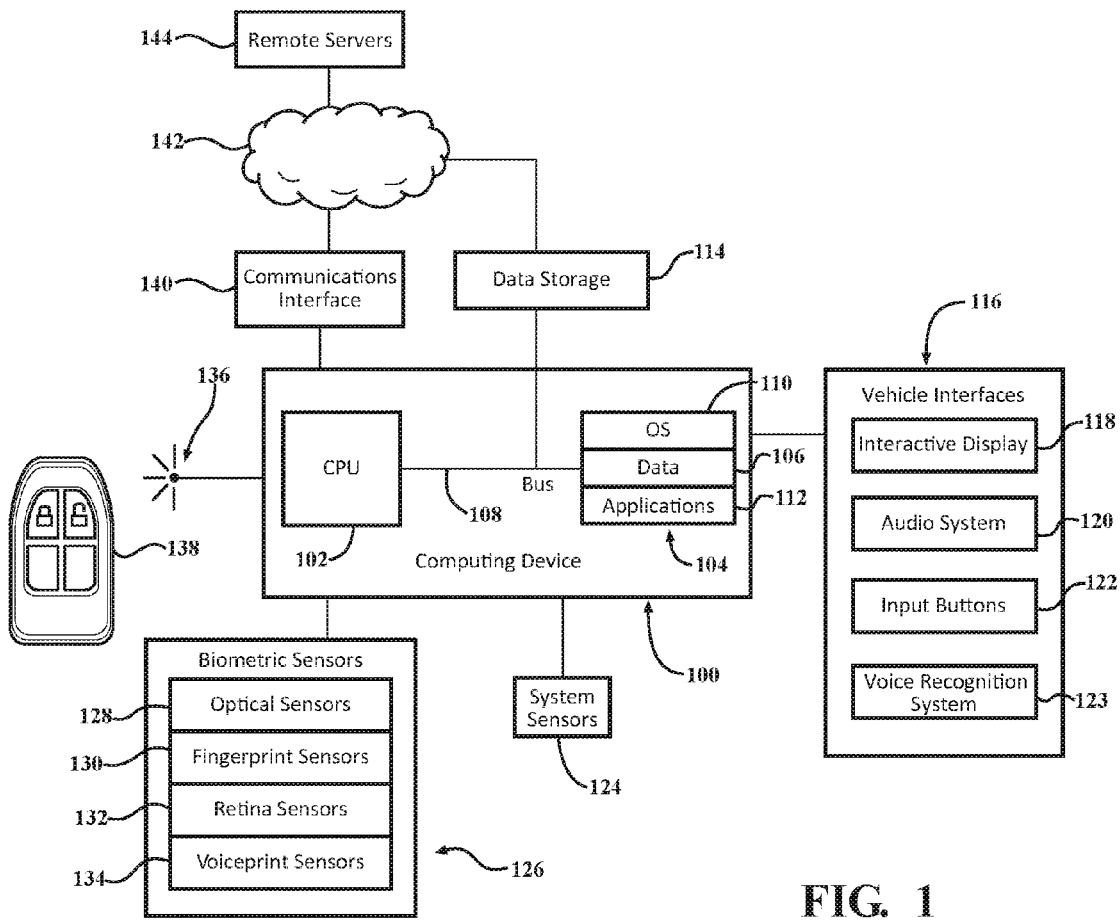
FIG. 1 is a schematic block diagram of a computing device for providing friendly maintenance notifications.

FIG. 1 is a schematic block diagram of a computing device 100 for providing friendly maintenance and recall notifications. The computing device 100 can be any type of vehicle-installed, handheld, desktop, or other form of single computing device, or can be composed of multiple computing devices. A processing unit in the computing device 100 can be a central processing unit (CPU) 102 or any other type of device, or multiple devices, capable of manipulating or processing information. A memory 104 in the computing device 100 can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to implement the friendly maintenance and recall notifications, as described below. The computing device 100 can also include secondary, additional, or external data storage 114, for example, a memory card, flash drive, or any other form of computer readable medium, including on a user's external mobile device or cloud storage accessible through a remote server. In one implementation, the installed applications 112 can be stored in whole or in part in the data storage 114 and loaded into the memory 104 as needed for processing.

The computing device 100 can be in direct or indirect communication with one or more vehicle interfaces 116 through which the driver can receive notifications from and/or send commands to the computing device 100. Example vehicle interfaces 116 can include an interactive display 118 (for example, a touch-screen display), an audio system 120 (which can include, for example, speakers and/or microphones), various input buttons 122, and/or a voice recognition system 123 (which can be paired with the audio system or share components therewith). The computing device 100 can be in direct or indirect communication with various system sensors 124 that can monitor a vehicle's systems and detect maintenance conditions. For example, one of the system sensors 124 can be used to monitor the engine oil level and can trigger an alert to be sent to the computing device 100 when the oil level is low. Other system sensors 124 can trigger alerts if an irregularity is detected in a vehicle's air bag deployment systems, electrical systems, tire air pressure, or any other vehicle system for which a driver notification is warranted. In general, the driver can be notified in connection with any maintenance conditions which are monitored by a vehicle and about which drivers are commonly notified in some manner (such as via a dashboard light).

The computing device 100 can also be in direct or indirect communication with one or more biometric sensors 126, which can be used to identify and authenticate the driver or other vehicle occupants. Examples of biometric sensors 126 can include optical sensors 128 (such as cameras), fingerprint sensors 130, retina sensors 132, and voiceprint sensors 134. The biometric sensors 126 can capture biometric data about the driver, which can be sent to the computing device 100 through the bus 108 or can be stored in memory 104 or data storage 114 for later retrieval by the computing device 100.

The computing device 100 can be in direct or indirect communication with a wireless transmitter/receiver 136 with which the computing device 100 can communicate with a wireless key fob 138 carried by the driver. The computing device 100 can also include a communications interface 140 (which can include, for example, a vehicle data communications module configured to communicate with a data center associated with the vehicle) with which the computing device 100 can communicate with external sources through a network 142, such as the internet. If the data storage 114 is located remotely, such as in the case of cloud storage, the communications interface 140 can be used to connect through the network 142 to the data storage 114. The communications interface 140 can also be used to connect to one or more remote servers 144. The communications interface 140 can communicate using a unique identifier such as a vehicle identification number (VIN) to identify and authenticate the vehicle to a remote server 144.

Figure 2:
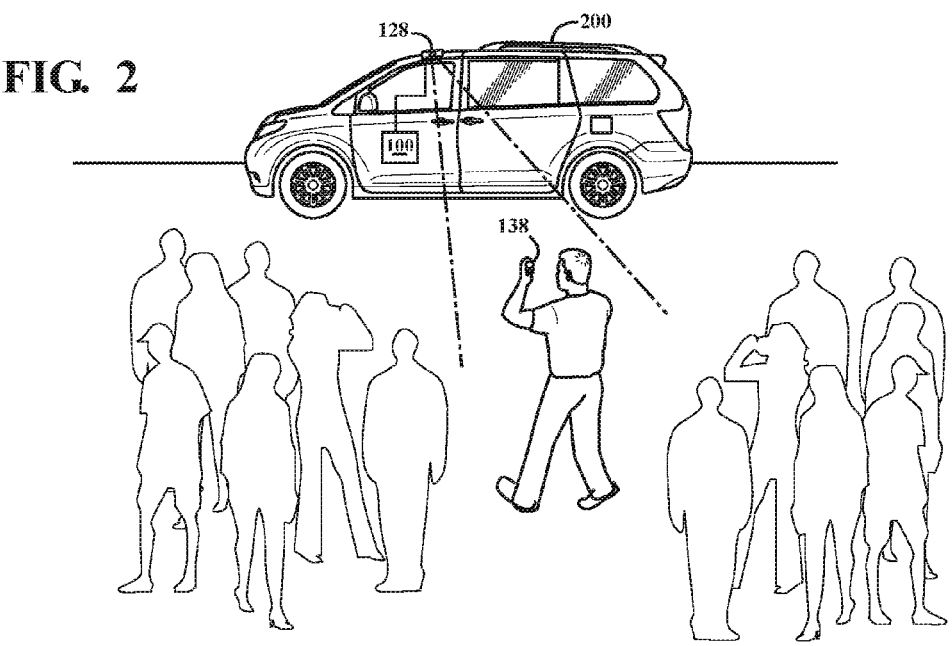
FIG. 2 is a pictorial representation of a vehicle including the computing device of FIG. 1.

FIG. 2 is a pictorial representation of a vehicle 200 in direct or indirect communication with the computing device 100. The computing device 100 can be located within the vehicle 200 or can be located remotely from the vehicle 200 in an alternate location. If the computing device 100 is remote from the vehicle 200, the vehicle 200 can include the capability of communicating with the computing device 100, such as through the communications interface 140.

In accordance with one example embodiment, the computing device 100 can monitor the vehicle systems using the system sensors 124 and can issue notifications to the driver when there is a current maintenance condition. For example, a notification can be issued to the driver when the system sensors 124 detect an irregularity or anomaly in one of the vehicle systems. In addition, notifications can be issued at regular intervals, based on time or mileage. For example, a notification to change the vehicle's 200 oil can be scheduled three months after an oil change is performed, or upon three thousand miles driven since the last oil change.

In accordance with one example implementation, the driver can be notified of a current maintenance condition with a "friendly" notification that is of a light-hearted or humorous nature, which can be more effective than a standard warning chime or light as found in existing maintenance notification systems. A driver may find a "friendly" notification more memorable, which would encourage the driver to address the maintenance condition more promptly, and would make vehicle maintenance conditions appear less daunting to less technically inclined drivers.

The "friendly" notifications can be audible notifications over the audio system 120 or visual notifications displayed on the interactive display 118. A notification can comprise a recording of a person describing or explaining the maintenance condition in a joking or friendly way. A notification can also comprise a recording of movie, television show, or song that relates to the maintenance condition (such as a quote of one character talking to another character about a vehicle's tail light being out), or a recording of a recognizable actor specifically recorded to remind drivers about maintenance.

A notification can be provided in audio or video immediately upon detection of the maintenance condition, or every time thereafter the vehicle 200 is first turned on. The driver can be prompted to affirmatively acknowledge receipt of the notification, such as by pressing an "OK" button (for example on the interactive display 118) or voicing acknowledgement to the voice recognition system 123. After the driver acknowledges the notification, the computing device 100 can cease notifying the driver of the maintenance condition using the notification, for example, until the next time the driver starts the vehicle 200.

The notifications can be retrieved from a database, which can be stored in the memory 104 or data storage 114, including online in cloud storage accessible using the communications interface 140. A notification can be specific to a maintenance condition (i.e., low oil, low tire pressure, engine temperature warning, air bag system irregularity, etc.). The database can contain a plurality of notifications available with respect to each maintenance condition. When a maintenance condition occurs, the computing device 100 can select one of the plurality of notifications associated with that maintenance condition to be provided to the driver.

In one example implementation, the notification to be provided to the driver is selected at random from among the plurality of available notifications with respect to the relevant maintenance condition. Randomization can be advantageous because the driver will be more likely to listen to a notification that he or she has not already heard, especially if notifications regarding the maintenance condition are provided each time the driver turns on the vehicle 200. For example, if the oil needs to be changed, then one time the driver can receive one notification, such as "If you love me, change my oil please!" and another time the driver can receive a different notification, such as "Me hungry! Feed me oil!"

The computing device 100 can provide escalating notifications to the driver if the maintenance condition persists and the driver has not successfully addressed it (i.e., by changing the oil, etc.). Escalating notifications can have a more urgent tone in order to impress upon the driver the risks of ignoring the maintenance condition, while still maintaining a humorous or friendly theme. As an example, an initial friendly notification provided upon a scheduled oil change may be a voice saying, "If you love me, change my oil please!" However, if the driver continues to drive the vehicle 200 and does not change the oil, a later notification could be as follows: "A thousand miles ago I told you you should change my oil if you love me. Now, I'm asking you to change my oil even if you just like me!"

The notifications can be personalized according to the preferences of the driver, which would require driver identification. In accordance with one example implementation, the driver can be identified and authenticated by the computing device 100 with reference to the driver's biometric data, as gathered using the biometric sensors 126 such as the optical sensors 128. However, the user of the disclosed devices, systems, and methods does not need to be the driver, and can be another passenger or occupant of the vehicle 200, as identified and authenticated as described herein, without departing from the spirit or scope of the disclosure.

In addition, the manufacturer or dealer of the vehicle may from time to time discover a recall condition affecting the vehicle 200. (The recall condition may be known to affect every vehicle of this particular model, or certain vehicles that were manufactured at a certain time or in a certain plant, or some other set of vehicles to which vehicle 200 belongs.) A manufacturer representative can issue a recall notification from a remote source such as the remote server 144 to all affected vehicles, including the vehicle 200. Each vehicle that is supposed to receive the recall notice can be identified by a unique identifier such as a VIN. The VIN can be associated with an IP address which can allow the remote server 144 to connect to the communications interface 140.

Upon the computing device 100's receipt of the recall notification, the recall notification can be stored in the memory 104 or data storage 114, and/or presented to the driver. The recall notification can be presented to the driver immediately upon receipt from the remote server 144 or every time thereafter the vehicle 200 is first turned on. The recall notification can be presented as an audible notification over the audio system 120 or a visual notification displayed on the interactive display 118. The driver can be prompted to affirmatively acknowledge receipt of the notification, such as by pressing an "OK" button (for example on the interactive display 118) or voicing acknowledgement to the voice recognition system 123. After the driver acknowledges the notification, the computing device 100 can cease notifying the driver of the recall condition using the notification, for example, until the next time the driver starts the vehicle 200.

In one example implementation, the recall notifications can be "friendly," just like the maintenance notifications. Specifically, instead of presenting the recall notification received from the remote server 144 as is to the driver, the computing device 100 can modify the recall notification received from the remote server 144 by including "friendly content" comprising one or more light-hearted or humorous statements or insertions that relate to fixing the vehicle (or the particular vehicle system associated with the recall condition). In addition, the friendly content can be associated with a style, class, or theme for which the driver has previously indicated a preference. As with the friendly maintenance notifications, by utilizing driver identification, different classes or themes of friendly content can be used for different drivers, consistent with each respective driver's preferences (as described in more detail below regarding friendly maintenance notifications). Meanwhile, the technical information regarding the recall condition contained in the recall notification can be kept the same for all drivers. In one example implementation, different variations of the recall notifications can be available so that the driver is presented with different randomly selected friendly content each time the recall notification is presented.

As shown in FIG. 2, one or more optical sensors 128 can be used to identify the driver, which can be used if multiple drivers have different sets of preferences regarding a preferred style or class of notifications/notifications. The optical sensors 128 can detect a person approaching the vehicle 200. Movement in the field of view of the optical sensors 128 can indicate that there is a person requiring identification, and known image pattern recognition techniques can be used to detect the presence of a person to be identified (as opposed to another vehicle or an animal, etc.). The computing device 100 can thus identify the driver by the driver's unique biometric identifiers based on image or video data received from the optical sensors 128.

Figure 3:
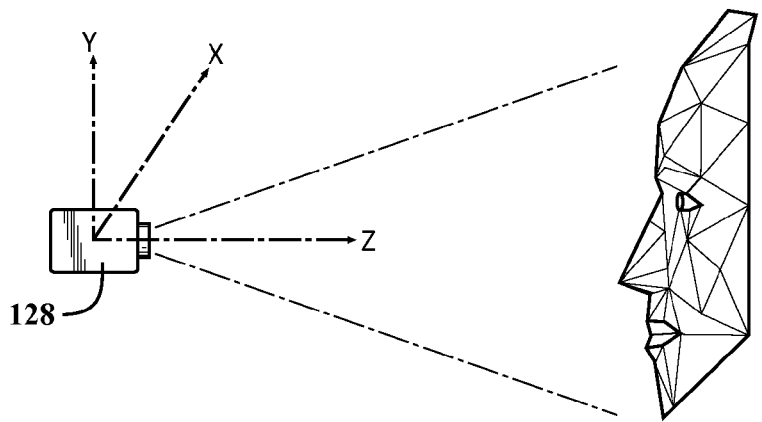
FIG. 3 is a pictorial representation of a driver facial map for use with driver identification and authentication.

One example of a biometric identifier that can be used to identify a driver is illustrated in FIG. 3, which shows an example facial map of person that can be captured by the optical sensors 128. Distance between the eyes, face shape, and other features can be used to uniquely identify an individual, or any other biometric marker can be used as well. Other example biometric identifiers include the person approaching the vehicle's 200 height, and the unique movement or gait of the person, each of which can be captured in images or video by the optical sensors 128 and processed by the computing device 100.

In another example implementation, one or more optical sensors 128 may be located in the interior of the vehicle 200.

Accordingly, the identification can be implemented when the driver gets into the vehicle 200 or sits down or turns on the vehicle 200, rather than on approach to the vehicle 200.

Other biometric sensors 126 that are not shown but can be employed include fingerprint sensors 130, which can be located on the exterior of the vehicle 200, such as on the door handle, or in the interior of the vehicle 200, such as on the dashboard, console, or steering wheel; retina sensors 132; voiceprint sensors 134 (which can be a part of the voice recognition system 123, in conjunction with pattern analysis performed by the computing device 100); or any other type of biometric sensor 126.

In an alternative example embodiment, the driver may be identified and authenticated by a unique signal received from the driver's key fob 138 or other electronic device carried by or otherwise associate with the driver (for example, the unique signal can be programmed into the driver's mobile phone). For additional security, both key fob identification and biometric identification may be employed in identifying and authenticating the driver.

Once the driver is identified and authenticated, the computing device 100 can retrieve information from a profile associated with the driver. The profile can be stored in the data storage 114, which can be stored in the vehicle 200 or remotely, such as in cloud storage. If the profile is located remotely, the computing device 100 can access it in real time over the network 142 using the communications interface 140, or the online version of the profile can be periodically or on demand downloaded to data storage 114 or memory 104 stored in the vehicle 200 (or synced with a version already stored in the vehicle 200) so that the computing device 100 can access it immediately without initiating a remote connection. Multiple driver profiles may be stored, and each profile can be associated with the particular driver's identification information (e.g., biometric information, key fob 138 identity, etc.).

The information included in a driver profile can include preferences as to what kind of notification the computing device 100 will provide to the driver in the event of a maintenance or recall condition. For example, the driver profile can identify the notifications that such driver liked and disliked. If a driver does not find a particular notification funny, the driver can communicate feedback indicating that the driver did not like that notification. If so, then the computing device 100 can cause that notification (or other notifications with the same or similar style of friendly content) not to be provided again to that driver. On the other hand, a driver can communicate feedback indicating that he or she did like the notification. Then, that notification can be provided more frequently (if, for example, the maintenance condition persists or returns), or other notifications in the same or similar style can be provided in the future with respect to other maintenance conditions or recall conditions (as described in more detail below).

Feedback can be communicated by the driver using the interactive display 118 or by voice using the voice recognition system 123. In another implementation, the driver can use input buttons 122 to provide feedback on the notifications. The input buttons 122 can be buttons specifically made for this purpose, or they can be multi-purpose buttons, such as directional buttons located on the steering wheel used for navigating various menus generally. In one example, an "up" directional button can be used to indicate that the driver likes the notification, whereas a "down" directional button can be used to indicate that the driver dislikes the notification.

In one example implementation, the feedback is not binary (that is, either "like" or "dislike"). Rather, the computing device 100 can be configured to accept a range of feedback, such as through a one-through-five-stars system, whereby the driver can rate the notification over a range of possible ratings to provide greater granularity to the driver's preferences. A high rating will cause the notification or similar notifications to be presented to the driver more frequently, and a low rating will cause the notification or similar notifications to be presented to the driver less frequently (or the lowest rating can cause the notification to never again be used).

"Liking" a notification or rating it highly can lead to a driver receiving similar notifications through the implementation of a "recommendation engine." In this implementation, if the driver likes a first notification, the computing device 100 can increase the probability of a second notification being presented to the driver, if other drivers who also like the first notification tend to like the second notification.

An initial "learning" process can also be provided when the driver first begins to use friendly notifications—or upon first use of the vehicle 200 after purchase—in order to populate the driver profile. During such process, the computing device 100 can pose questions to the driver relating to the driver's preferences regarding different types or classes of friendly notifications. The computing device 100 can provide the driver with several notifications and prompt the driver to rate each one. As another example, the driver can be provided with multiple choices of notifications and be prompted to select which one that the driver likes the best. The driver can be prompted to respond using the interactive display 118, or audibly using the voice recognition system 123.

The driver profile can be made accessible to the driver for editing, for example via an internet portal or mobile application. The driver can thus view what ratings or other feedback he or she has provided, and modify those ratings or feedback as desired. The driver can also be provided a list of some or all the possible notifications that are available to the computing device 100, which notifications can also be grouped by maintenance condition type (i.e., low oil, low tire pressure, engine temperature warning, air bag system irregularity, etc.) so that the driver can preemptively rate the notifications in advance of the notification being provided due to a maintenance condition. In this way, the driver can increase the accuracy of the recommendation engine so that the computing device 100 is more likely to provide notifications that the driver will find agreeable.

The notifications can also be grouped by class or theme, such as "Friendly Notifications," "Funny Notifications," or "Movie Related," or any other logical grouping. Thus, instead of choosing or rating notifications one by one, the driver can select what class of notification he or she would like to receive in the event of a maintenance condition. An online library—accessible, for example, using the communications interface 140—of notifications or notification themes can be set up to allow drivers to select additional classes or themes of notifications. The online library can be implemented in an e-commerce store that allows drivers to purchase those additional classes or themes.

In one example implementation, the computing device 100 can infer the driver's preferences from the driver's various social networking profiles, accessible over a network 142 (such as the internet). The driver can link his or her profile to his or her social networking profile by providing the computing device 100 with a URL (or other identifying address) to the social networking profile and, if required, credentials needed to log in to such social network, and any other information required by the social network to access the driver's profile thereon.

As an example, the computing device 100 may determine from the driver's social networking profile that the driver likes or is a fan of a particular media element such as a movie, television program, or musical artist/group. If so, then the computing device 100 can automatically set the notification theme to relate to that popular media (i.e., wherein each notification in the class is related to such media or a character from such media), or can suggest to the driver an option to select such notification theme.

As one example, a driver may have indicated on a social networking profile that he or she likes the television program Breaking Bad. If so, then a notification associated with an irregularity in the battery recharge system could reference the second-season episode entitled "4 Days Out" as follows: "Unless you're Walter White, you probably can't build a replacement car battery from spare parts, so you should go get your battery serviced."

The same profiles that are used to determine a driver's preferences for maintenance notifications can also be used in case the manufacture needs to issue recall notifications. Accordingly, the class or theme of notifications for which the driver has indicated a preference can also determine the class or theme of the friendly statements used in case of a recall notification.

Figure 4:
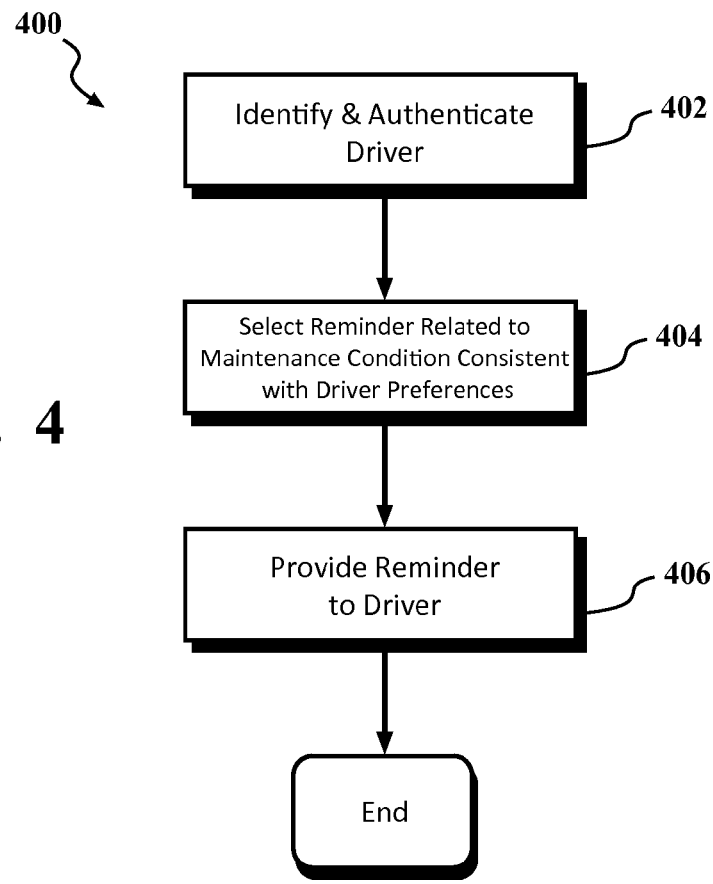
FIG. 4 is a logic flowchart of an example process for providing friendly maintenance notifications.

FIG. 4 is an example logic flowchart of a process 400 for providing friendly maintenance notifications. In step 402, the driver is identified and authenticated. This can be done, for example, using the biometric sensors 126, as described above. In step 404, the computing device 100 selects a notification from a plurality of notifications relating to a current maintenance condition, wherein the selected notification is consistent with a preference of the driver. This can be performed with reference to the driver's profile, as described above. The selection can be a random selection from all available notifications that relate to the current maintenance condition and are consistent with the driver's preference. The preference can be retrieved from the driver's profile and/or can be learned from a social networking profile associated with the driver. In step 406, the selected notification is provided to the driver. The notification can include audio and/or video. The notification can be provided when the maintenance condition first arises or upon the vehicle's 200 start-up. The notifications can vary based on random selection, the severity of the maintenance condition, or how long the driver has failed to address the maintenance condition. In addition, at this step the driver can be prompted to acknowledge receipt of the notification. Following this step, the process ends.

Figure 5:
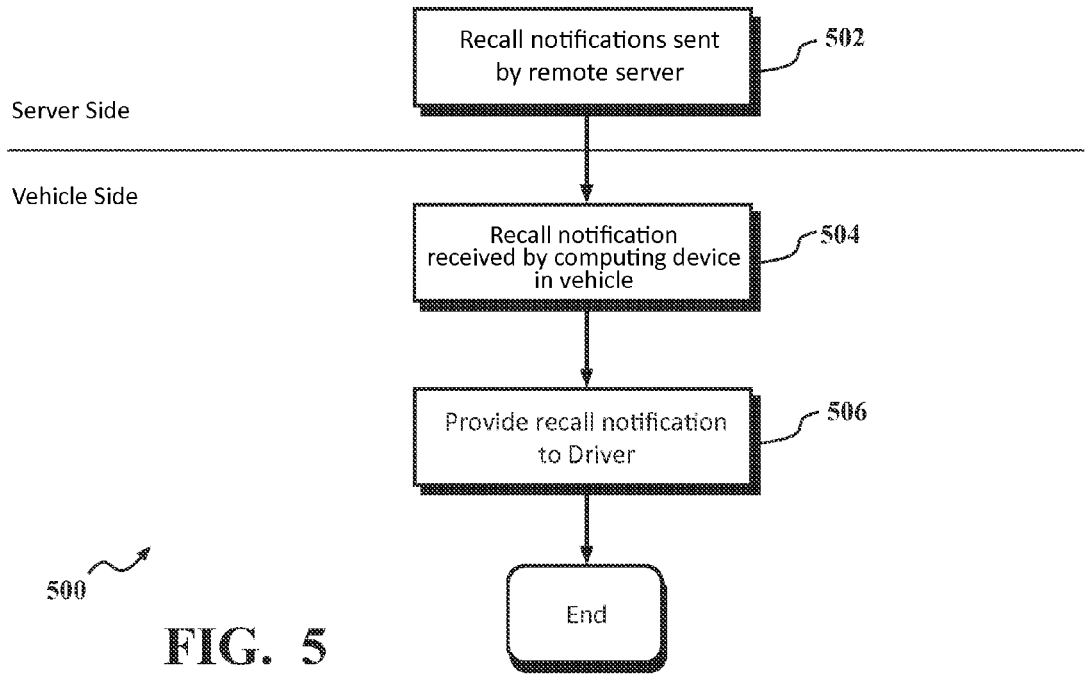
FIG. 5 is a logic flowchart of an example process for providing recall notifications.

FIG. 5 is an example logic flowchart of a process 500 for providing recall notifications. In step 502, a recall notification is sent by the remote server 144, which may be controlled by the vehicle manufacturer. In step 504, the vehicle 200 (such as through the computing device 100) receives the recall notification, such as through the communications interface 140. In step 506, the recall notification is presented to the driver. (In addition, at this step the driver can be prompted to acknowledge receipt of the recall notification.)

Figure 6:
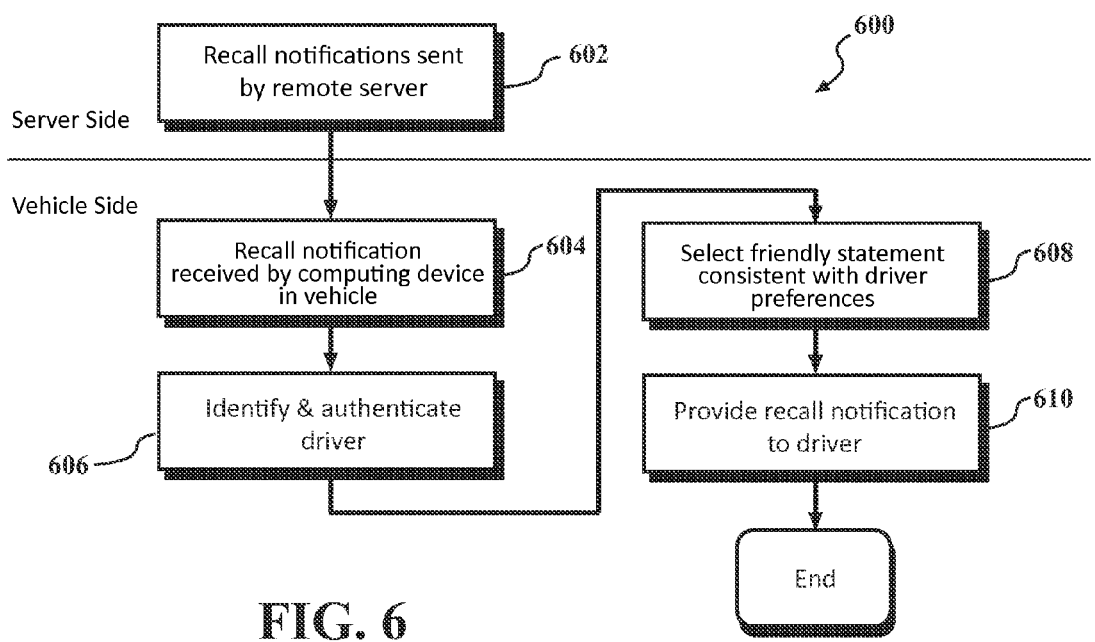
FIG. 6 is a logic flowchart of an example process for providing friendly recall notifications.

FIG. 6 is an example logic flowchart of a process 600 for providing friendly recall notifications. In step 602, a recall notification is sent by the remote server 144, which may be controlled by the vehicle manufacturer. In step 604, the vehicle 200 (such as through the computing device 100) receives the recall notification, such as through the communications interface 140. In step 606, the driver is identified and authenticated. This can be done, for example, using the biometric sensors 126, as described above. In step 608, the computing device 100 selects a friendly statement from a plurality of friendly statements, wherein the selected friendly statement is consistent with a preference of the driver. This can be performed with reference to the driver's profile, as described above. The friendly statement can relate to the particular vehicle system associated with the recall condition (such as the engine, air conditioner, seat mechanisms, etc.). The preference can be retrieved from the driver's profile and/or can be learned from a social networking profile associated with the driver. In step 610, the selected recall notification is provided to the driver, which recall notification includes one or more friendly statements. (In addition, at this step the driver can be prompted to acknowledge receipt of the recall notification.)

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, in the embodiments described above, the vehicle 200 is generally described an automobile. However, the vehicle 200 is not limited to an automobile, as the disclosed systems and methods could also be implemented with other vehicles generally controlled by a driver, or operator, such as airplanes, boats, trains, etc. In addition, the remote server 144 used in connection with sending the recall notifications is described as associated with the manufacturer of the vehicle 200. However, the remote server 144 could also be associated with a dealer or a government agency or any other entity that might be involved in releasing recall notifications to the public. The scope of the claims is thus to be accorded the broadest interpretation so as to encompass all such modifications and equivalent structures as is permitted under the law.

What is claimed is:

1. A computing device for a vehicle, comprising:
one or more processors for controlling operations of the computing device; and
a memory storing data and program instructions used by the one or more processors, wherein the one or more processors execute instructions stored in the memory to:
select, from a plurality of notifications that are all specific to one current maintenance condition relating to the vehicle but that are each associated with one of a plurality of different notification classes, based at least in part on random selection, one notification consistent with a preference of an occupant of the vehicle for the one notification's associated notification class; and
notify the occupant of the current maintenance condition using the selected one notification.

2. The computing device of claim 1, wherein the preference of the occupant is learned from information received from a social networking profile associated with the occupant.

3. The computing device of claim 1, wherein the one notification is selected from the plurality of notifications based at least in part on feedback previously provided by the occupant.

4. The computing device of claim 1, wherein the selected one notification comprises an audio notification delivered audibly.

5. The computing device of claim 1, wherein the selected one notification comprises a visual notification.

6. The computing device of claim 1, wherein at least one of the plurality of different notification classes is associated with a media element.

7. A system, comprising:
a vehicle;
at least one of an audio speaker and a display associated with the vehicle; and
the computing device of claim 1, wherein the selected one notification is delivered using the at least one of the audio speaker and the display.

8. The computing device of claim 1, wherein the one or more processors execute instructions stored in the memory to:
identify an occupant of the vehicle, wherein the selected one notification is consistent with a preference of the identified occupant for its associated notification class.

9. The computing device of claim 1, wherein each of the plurality of different notification classes is predefined as having a light-hearted or humorous theme.

10. The computing device of claim 8, wherein the occupant is identified based at least in part on biometric data received from one or more sensors.

11. The computing device of claim 8, wherein the occupant is identified based at least in part on a unique signal received from an electronic device associated with the occupant.

12. The computing device of claim 8, wherein the preference of the occupant is stored in an occupant profile.

13. A computer-implemented method, comprising:
sending, by a remote server to a vehicle, a recall notification containing technical information specific to a recall condition associated with the vehicle;
receiving, by a computing device associated with the vehicle, the recall notification;
modifying the recall notification, by the computing device, to contain content in addition to the technical information specific to the recall condition associated with one of a plurality of different content classes, based at least in part on a random selection of the content and at least in part on a preference of an occupant of the vehicle for the content's associated content class; and
notifying the occupant of the recall condition, by the computing device, using the modified recall notification.

14. The method of claim 13, further comprising:
identifying, by the computing device, an occupant of the vehicle, wherein the content is consistent with a preference of the identified occupant for the content's associated content class.

15. The method of claim 14, wherein the occupant is identified based at least in part on biometric data received from one or more sensors.

16. The method of claim 14, wherein the occupant is identified based at least in part on a unique signal received from an electronic device associated with the occupant.

17. The method of claim 14, wherein the preference of the occupant is stored in an occupant profile.

18. The method of claim 13, wherein the modification to the recall notification is based at least in part on feedback previously provided by the occupant.

19. The method of claim 13, wherein the modified recall notification comprises at least one of an audio notification delivered over an audio speaker, and a visual notification displayed on a display in communication with the computing device.

20. The method of claim 13, wherein each of the plurality of different content classes is predefined as having a light hearted or humorous theme.

* * * * *